US010672128B2

United States Patent
Han

(10) Patent No.: US 10,672,128 B2
(45) Date of Patent: *Jun. 2, 2020

(54) ONLINE LEARNING ENHANCED ATLAS-BASED AUTO-SEGMENTATION

(71) Applicant: Elekta, Inc., St. Charles, MO (US)

(72) Inventor: Xiao Han, Chesterfield, MO (US)

(73) Assignee: Elekta, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/522,051

(22) Filed: Jul. 25, 2019

(65) Prior Publication Data

US 2019/0347800 A1 Nov. 14, 2019

Related U.S. Application Data

(63) Continuation of application No. 15/386,673, filed on Dec. 21, 2016, now Pat. No. 10,410,348.

(51) Int. Cl.
*G06T 7/00* (2017.01)
*G06T 7/11* (2017.01)

(52) U.S. Cl.
CPC .............. *G06T 7/11* (2017.01); *G06T 7/0012* (2013.01); *G06T 7/0014* (2013.01);
(Continued)

(58) Field of Classification Search
CPC ................... G06T 7/0012; G06T 7/11; G06T 2207/10004; G06T 2207/30004;
(Continued)

(56) References Cited

U.S. PATENT DOCUMENTS 9,122,950 B2 9/2015 Han
2009/0060308 A1* 3/2009 Dawant ................. G06T 7/33
382/131
(Continued)

FOREIGN PATENT DOCUMENTS

CN 110235175 A 9/2019

OTHER PUBLICATIONS

Joshi et al. ("Unbiased diffeomorphic atlas construction for computational anatomy," Neuroimage 23 (2004)) (Year: 2004).*
(Continued)

*Primary Examiner* — Yubin Hung
(74) *Attorney, Agent, or Firm* — Schwegman Lundberg & Woessner, P.A.; Sanjay Agrawal

(57) ABSTRACT

An image segmentation method is disclosed. The method includes receiving a plurality of atlases and a subject image, each atlas including an atlas image showing a structure of interest and associated structure delineations, the subject image being acquired by an image acquisition device and showing the structure of interest. The method further includes calculating, by an image processor, mapped atlases by registering the respective atlases to the subject image, and determining, by the image processor, a first structure label map for the subject image based on the mapped atlases. The method also includes training, by the image processor, a structure classifier using a subset of the mapped atlases, and determining, by the image processor, a second structure label map for the subject image by applying the trained structure classifier to one or more subject image points in the subject image. The method additional includes combining, by the image processor, the first label map and the second label map to generate a third label map representative of the structure of interest.

20 Claims, 6 Drawing Sheets

(52) U.S. Cl.
CPC ............... *G06T 2207/10004* (2013.01); *G06T 2207/20081* (2013.01); *G06T 2207/20084* (2013.01); *G06T 2207/20128* (2013.01); *G06T 2207/30004* (2013.01)

(58) Field of Classification Search
CPC . G06T 2207/20081; G06T 2207/20128; G06T 2207/20084; G06K 9/6256
See application file for complete search history.

(56) References Cited

U.S. PATENT DOCUMENTS

| | | | | |
|---|---|---|---|---|
| 2014/0247977 | A1* | 9/2014 | Han | G06K 9/34 382/159 |
| 2014/0328527 | A1* | 11/2014 | Zhou | G06K 9/66 382/131 |
| 2015/0248768 | A1* | 9/2015 | Garnavi | G06T 7/10 382/180 |
| 2017/0200067 | A1* | 7/2017 | Zhou | G06T 7/143 |
| 2017/0213339 | A1* | 7/2017 | Hibbard | G06T 7/38 |
| 2017/0294027 | A1* | 10/2017 | Babenko | G06K 9/4628 |
| 2018/0005077 | A1 | 1/2018 | Wang et al. | |
| 2018/0045622 | A1* | 2/2018 | Deisseroth | B01L 3/502 |
| 2018/0121760 | A1* | 5/2018 | Santamaria-Pang | G09B 23/303 |
| 2018/0174300 | A1 | 6/2018 | Han | |

OTHER PUBLICATIONS

Han et al. ("Atlas-based auto-segmentation of head and neck CT images," 2008 International Conference on Medical Image Computing and Computer-Assisted Intervention, pp. 434-441) (Year: 2008).*

"U.S. Appl. No. 15/386,673, Final Office Action dated Dec. 10, 2018", 17 pgs.

"U.S. Appl. No. 15/386,673, Non Final Office Action dated Jan. 24, 2019", 19 pgs.

"U.S. Appl. No. 15/386,673, Non Final Office Action dated Aug. 7, 2018", 16 pgs.

"U.S. Appl. No. 15/386,673, Notice of Allowance dated May 1, 2019", 9 pgs.

"U.S. Appl. No. 15/386,673, Response filed Jan. 4, 2019 to Final Office Action dated Dec. 10, 2018", 9 pgs.

"U.S. Appl. No. 15/386,673, Response filed Mar. 28, 2019 to Non Final Office Action dated Jan. 24, 2019", 4 pgs.

"U.S. Appl. No. 15/386,673, Response filed Sep. 17, 2018 to Non Final Office Action dated Aug. 7, 2018", 10 pgs.

"International Application Serial No. PCT/US2017/063964, International Search Report dated Mar. 8, 2018", 6 pgs.

"International Application Serial No. PCT/US2017/063964, Written Opinion dated Mar. 8, 2018", 11 pgs.

Aljabar, P, et al., "Multi-atlas based segmentation of brain images: Atlas selection and its effect on accuracy", Neuroimage, Elsevier, Amsterdam, NL, vol. 46, No. 3, (Jul. 1, 2009), 726-738.

Athiwaratkun, et al., "Feature Representation In Convolutional Neural Networks", arXiv:1507.02313v1 [cs.CV], (Jul. 2015), 1-6.

Collins, D Louis, et al., "Animal+Insect: Improved Cortical Structure Segmentation", In: Information Processing in Medical Imaging, A. Kuba et al. (eds.), vol. 1613, (Jan. 1, 1999), 210-223.

Han, Xiao, et al., "Atlas-based Auto-segmentation of Head and Neck CT Images", International Conference on Medical Image Computing and Computer-Assisted Intervention, [Online] Retrieved from the internet: <https://www.researchgate.net/publication/23449988_Atlas-Based Auto-segmentation of Head and Neck CT Images>, (2008), 9 pgs.

Hertel, Lars, et al., "Deep Convolutional Neural Networks as Generic Feature Extractors", 2015 International Joint Conference on Neural Networks, Institute for Signal Processing, (Dec. 17, 2015), 4 pgs.

Hongzhi, Wang, et al., "A learning-based wrapper method to correct systematic errors in automatic image segmentation: Consistently improved performance in hippocampus, cortex and brain segmentation", Neuroimage, Elsevier, Amsterdam, NL, vol. 55, No. 3,, (Jan. 5, 2011), 968-985.

Joshi, S, et al., "Unbiased diffeomorphic atlas construction for computational anatomy", NeuroImage, vol. 23 Suppl 1, (2004), S151-S160.

Torsten, Rohlfing, et al., "Evaluation of atlas selection strategies for atlas-based image segmentation with application to confocal microscopy images of bee brains", Neuroimage, vol. 21, No. 4, (Apr. 1, 2004), 1428-1442.

Wolz, Robin, et al., "Multi-organ Abdominal CT Segmentation Using Hierarchically Weighted Subject-Specific Atlases", ECCV, Medical Image Computing and Computer-Assisted Intervention 2012, N. Ayache et al. (eds.), (Oct. 1, 2012), 10-17.

Yang, et al., "Patch-based label fusion for automatic multi-atlas-based prostate segmentation in MR images", Proceedings of the SPIE, vol. 9786, (Mar. 2016).

Zikic, D, et al., "Encoding atlases by randomized classification forests for efficient multi-atlas label propagation", Medical Image Analysis, vol. 18, No. 8, (Dec. 1, 2014), 1262-1273.

Zikic, Darko, et al., "Atlas Encoding by Randomized Forests for Efficient Label Propagation", Medical Image Computing and Computer-Assisted Intervention—MICCAI 2013, [Online] Retrieved from the internet: <http://www.miccai2013.org/conference-program/06-03/.>, (Sep. 25, 2013), 14-30.

Zikic, Darko, et al., "Classifier-Based Multi-atlas Label Propagation with Test-Specific Atlas Weighting for Correspondence-Free Scenarios", ECCV 2016 Conference, vol. 8848, Medical Computer Vision, B. Menze et al. (eds.),, (Jan. 1, 2014), 116-124.

U.S. Appl. No. 15/386,673, filed Dec. 21, 2016, Online Learning Enhanced Atlas-Based Auto-Segmentation.

"International Application Serial No. PCT/US2017/063964, International Preliminary Report on Patentability dated Jul. 4, 2019", 13 pgs.

* cited by examiner

ONLINE LEARNING ENHANCED ATLAS-BASED AUTO-SEGMENTATION

PRIORITY APPLICATIONS

This application is a continuation of U.S. application Ser. No. 15/386,673, filed on Dec. 21, 2016, which is hereby incorporated by reference in its entirety.

TECHNOLOGY FIELD

The disclosure relates to atlas-based auto-segmentation (ABAS) and, more particularly, to systems and methods for online learning enhanced ABAS.

BACKGROUND

Determination of structures, such as organs, in a patient and extraction of the shape of a structure is essential to many medical imaging applications, such as diagnostic imaging, image-guided surgery, or image-guided radiation therapy. In such applications, a target structure or target structures need to be determined from an image, such as a computed tomography (CT) image, of the patient. The determination of the target structure(s) in the patient is usually known as structure contouring or segmentation. Although manual contouring by human experts, also referred to as raters, is still a common approach for high quality segmentation in clinics, manual contouring is tedious and time-consuming, and may suffer from large intra- and/or inter-rater variations.

Automated segmentation of images can be challenging due to noises and other artifacts, as well as limited image contrast for many soft-tissue structures. In recent years, atlas-based auto-segmentation (ABAS) techniques have shown promise as a solution. The ABAS includes performing segmentation of a subject image using one or more previously-segmented images, such as segmented images from previously treated patients or from previous treatments of the same subject patient. The previously-segmented images together with their annotations, e.g., structure label maps or structure surfaces, are referred to as atlases. By aligning an atlas image to a new subject image obtained from the subject patient through image matching, also referred to as image registration, an image transformation is computed. Structure labels for the subject image are produced by mapping structure labels defined on the atlas to the subject image using the computed image transformation.

The accuracy of ABAS usually relies on the quality and quantity of atlas images used. For example, multiple atlases can be used during the ABAS process to provide redundancy. On the other hand, atlas images showing similar underlying objects of those in the subject image may also help improve accuracy in labeling the subject image. The disclosed methods and systems are designed to further improve the accuracy of conventional ABAS for image segmentation.

SUMMARY

One aspect of the disclosure is directed to an image segmentation method. The method includes receiving a plurality of atlases and a subject image, each atlas including an atlas image showing a structure of interest and associated structure delineations, the subject image being acquired by an image acquisition device and showing the structure of interest. The method further includes calculating, by an image processor, mapped atlases by registering the respective atlases to the subject image, and determining, by the image processor, a first structure label map for the subject image based on the mapped atlases. The method also includes training, by the image processor, a structure classifier using a subset of the mapped atlases, and determining, by the image processor, a second structure label map for the subject image by applying the trained structure classifier to one or more subject image points in the subject image. The method additional includes combining, by the image processor, the first label map and the second label map to generate a third label map representative of the structure of interest.

Another aspect of the disclosure is directed to an image segmentation system. The system includes a memory and an image processor coupled to the memory. The memory is configured to receive and store a plurality of atlases and a subject image, each atlas including an atlas image showing a structure of interest and associated structure delineations, the subject image being acquired by an image acquisition device and showing the structure of interest. The image processor is configured to calculate mapped atlases by registering the respective atlases to the subject image, and determine a first structure label map for the subject image based on the mapped atlases. The image processor is further configured to train a structure classifier using a subset of the mapped atlases, and determine a second structure label map for the subject image by applying the trained structure classifier to one or more subject image points in the subject image. The image processor is also configured to combine the first label map and the second label map to generate a third label map representative of the structure of interest.

Yet another aspect of the disclosure is directed to a non-transitory computer-readable storage medium storing instructions that, when executed by an image processor, cause the processor to perform an image segmentation method. The method includes receiving a plurality of atlases and a subject image, each atlas including an atlas image showing a structure of interest and associated structure delineations, the subject image being acquired by an image acquisition device and showing the structure of interest. The method further includes calculating mapped atlases by registering the respective atlases to the subject image, and determining a first structure label map for the subject image based on the mapped atlases. The method also includes training a structure classifier using a subset of the mapped atlases, and determining a second structure label map for the subject image by applying the trained structure classifier to one or more subject image points in the subject image. The method additional includes combining the first label map and the second label map to generate a third label map representative of the structure of interest.

Features and advantages consistent with the disclosure will be set forth in part in the description which follows, and in part will be obvious from the description, or may be learned by practice of the disclosure. Such features and advantages will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWING

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Hereinafter, embodiments consistent with the disclosure will be described with reference to the drawings. Wherever possible, the same reference numbers will be used throughout the drawings to refer to the same or like parts.

Embodiments consistent with the disclosure include systems and methods for online learning enhanced atlas-based auto-segmentation (ABAS). Detailed descriptions of some examples not specified herein, such as detailed descriptions of the ABAS method, can be found in Applicant's prior application, issued as U.S. Pat. No. 9,122,950, the entire contents of which are incorporated herein by reference.

The disclosed systems and methods are generally designed to segment a subject image based on one or more atlases. As used consistently herein, an "atlas" includes an image and corresponding structure delineations (annotations) indicating what structure(s) the image points belong to. A "subject image" is an image of a subject patient and is yet to be segmented. The disclosed methods and systems will be applied to segment the subject image based on one or more atlases. The subject image can be acquired by image acquisition devices.

The image in an atlas, also referred to as an atlas image, can be an image of another patient or a previous image of the subject patient taken at an earlier time. In the disclosure, an image, either the subject image or an atlas image, includes a plurality of image points, which can be referred to as pixels if the image is a two-dimensional (2D) image or voxels if the image is a three-dimensional (3D) image. An image point in the subject image is referred to as a subject image point. Similarly, an image point in an atlas image is referred to as an atlas image point.

The structure delineations can be represented as, for example, structure label maps, structure surfaces, or structure contours. The description below uses the label maps as an example of the structure delineations and is similarly applied to the scenarios of structure surfaces and contours. A label map refers to a map of structure labels each identifying a corresponding image point as being within a particular structure of interest. Alternatively, consistent with this disclosure, a label map may also be a probability map, which contains structure labels that each represents the probability of the image point belonging to the structure. For example, when segmenting a subject image including multiple structures, a structure label of an image point may provide a set of probability values indicting how likely the image point belonging to each of the structures under consideration. The disclosed systems and methods provide an estimated structure label map for the subject image.

Figure 1:
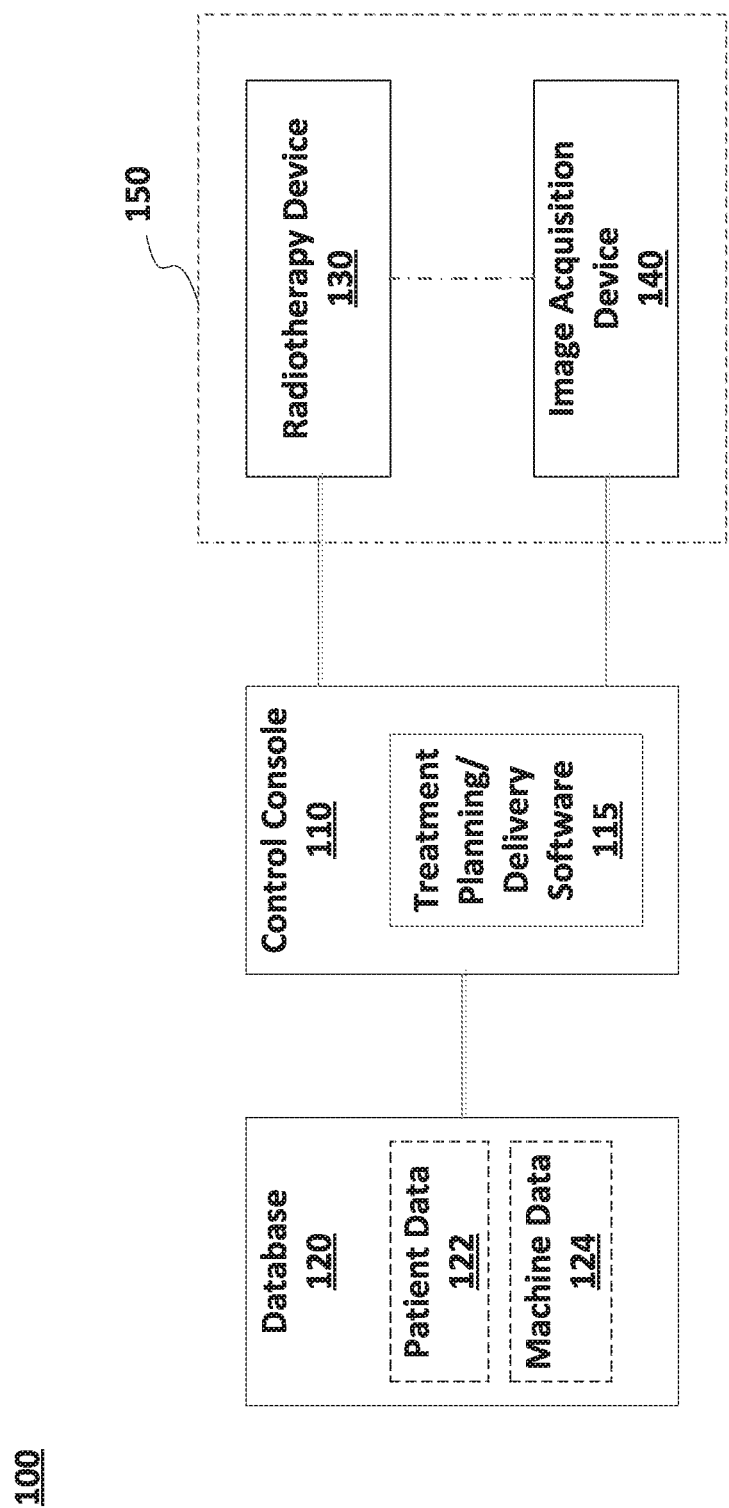
FIG. 1 is a block diagram showing an exemplary radiotherapy system, according to some embodiments of the present disclosure.

FIG. 1 is a block diagram showing an exemplary radiotherapy system 100, according to some embodiments of the present disclosure. Radiotherapy system 100 may be an IGRT system. As shown in FIG. 1, radiotherapy system 100 may include a control console 110, a database 120, a radiotherapy device 130, and an image acquisition device 140. In some embodiments, radiotherapy device 130 and image acquisition device 140 may be integrated into a single image-guided radiotherapy device 150, as indicated by the dashed box 150 in FIG. 1. In some embodiments, radiotherapy device 130 and image acquisition device 140 may be separate devices. In some embodiments, radiotherapy device 130 and image acquisition device 140 may be physically or communicative connected to each other, as indicated by a dotted-dashed line between radiotherapy device 130 and image acquisition device 140 in FIG. 1.

Control console 110 may include hardware and software components to control radiotherapy device 130 and image acquisition device 140 and/or to perform functions or operations such as treatment planning, treatment execution, image acquisition, image processing, motion tracking, motion management, or other tasks involved in a radiotherapy process. The hardware components of control console 110 may include one or more computers (e.g., general purpose computers, workstations, servers, terminals, portable/mobile devices, etc.); processor devices (e.g., central processing units (CPUs), graphics processing units (GPUs), microprocessors, digital signal processors (DSPs), field programmable gate arrays (FPGAs), special-purpose or specially-designed processors, etc.); memory/storage devices (e.g., read-only memories (ROMs), random access memories (RAMs), flash memories, hard drives, optical disks, solid-state drives (SSDs), etc.); input devices (e.g., keyboards, mice, touch screens, mics, buttons, knobs, trackballs, levers, handles, joysticks, etc.); output devices (e.g., displays, printers, speakers, vibration devices, etc.); or other suitable hardware. The software components of control console 110 may include operation system software, application software, etc. For example, as shown in FIG. 1, control console 110 may include treatment planning/delivery software 115 that may be stored in a memory/storage device of control console 110. Software 115 may include computer readable and executable codes or instructions for performing the processes described in detail below. For example, a processor device of control console 110 may be communicatively connected to a memory/storage device storing software 115 to access and execute the codes or instructions. The execution of the codes or instructions may cause the processor device to perform operations to achieve one or more functions consistent with the disclosed embodiments.

Control console 110 may be communicatively connected to database 120 to access data. In some embodiments, database 120 may be implemented using local hardware devices, such as one or more hard drives, optical disks, and/or servers that are in the proximity of control console 110. In some embodiments, database 120 may be implemented in a data center or a server located remotely with respect to control console 110. Control console 110 may access data stored in database 120 through wired or wireless communication.

Database 120 may include patient data 122. Patient data may include information such as (1) imaging data associated with a patient anatomical region, organ, or volume of interest segmentation data (e.g., MRI, CT, X-ray, PET, SPECT, and the like); (2) functional organ modeling data (e.g., serial versus parallel organs, and appropriate dose response models); (3) radiation dosage data (e.g., may include dose-volume histogram (DVH) information); or (4) other clinical information about the patient or course of treatment.

Database 120 may include machine data 124. Machine data 124 may include information associated with radiotherapy device 130, image acquisition device 140, or other machines relevant to radiotherapy, such as radiation beam size, arc placement, on/off time duration, radiation treatment plan data, multi-leaf collimator (MLC) configuration, MRI pulse sequence, and the like.

Image acquisition device 140 may provide medical images of a patient. For example, image acquisition device 140 may provide one or more of MRI images (e.g., 2D MRI, 3D MRI, 2D streaming MRI, 4D volumetric MRI, 4D cine MRI); Computed Tomography (CT) images; Cone-Beam CT images; Positron Emission Tomography (PET) images; functional MRI images (e.g., fMRI, DCE-MRI, diffusion MRI); X-ray images; fluoroscopic images; ultrasound images; radiotherapy portal images; Single-Photo Emission Computed Tomography (SPECT) images; and the like. Accordingly, image acquisition device 140 may include an MRI imaging device, a CT imaging device, a PET imaging device, an ultrasound imaging device, a fluoroscopic device, a SPECT imaging device, or other medical imaging devices for obtaining the medical images of the patient.

Radiotherapy device 130 may include a Leksell Gamma Knife, a linear accelerator or LINAC, or other suitable devices capable of delivering radiation to an anatomical region of interest of a patient in a controllable manner.

Figure 2:
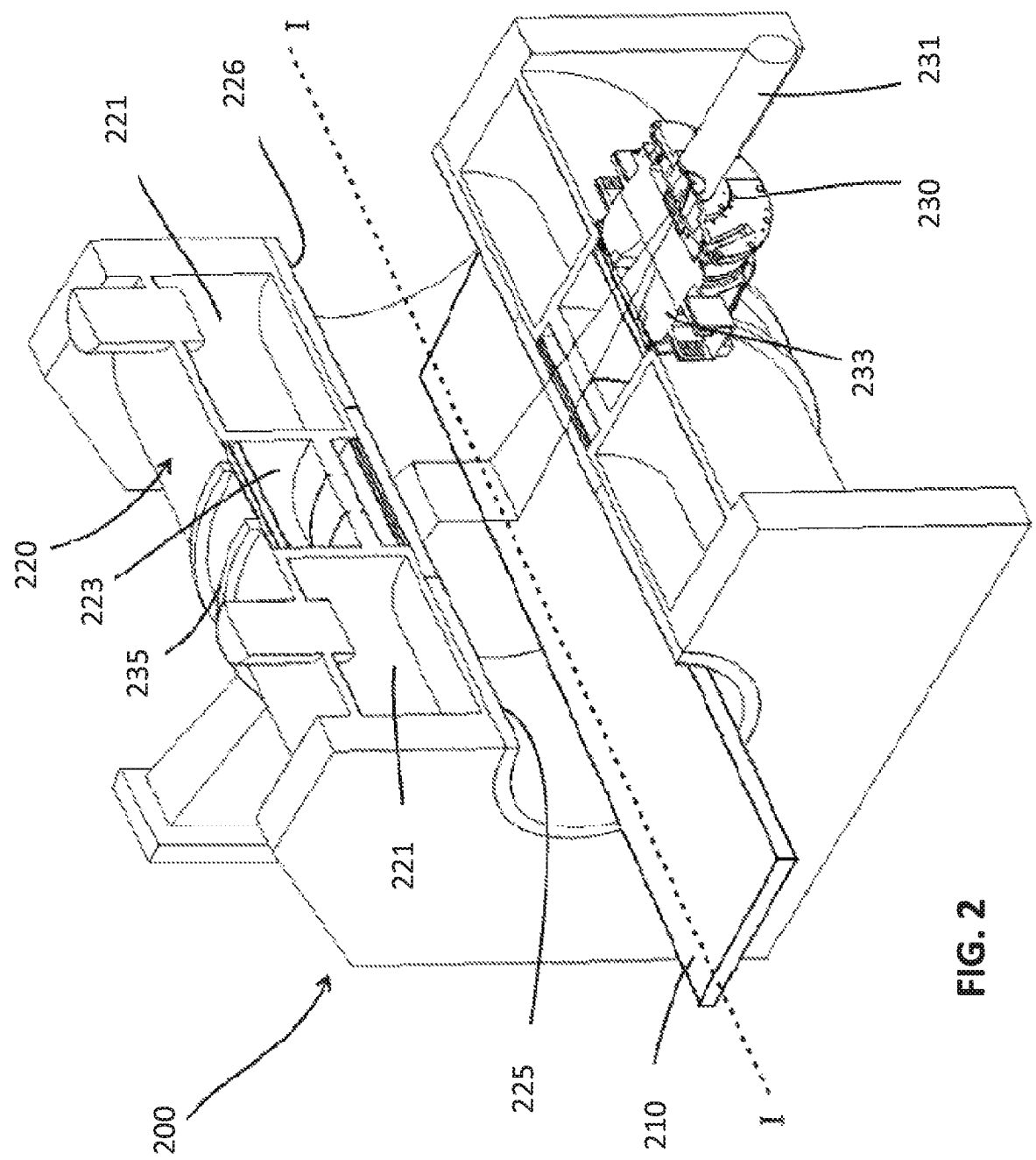
FIG. 2 depicts an exemplary image-guided radiotherapy device, according to some embodiments of the present disclosure.

FIG. 2 depicts an exemplary image-guided radiotherapy system 200, consistent with disclosed embodiments. As shown, system 200 may include a couch 210, an image acquisition device 220, and a radiation delivery device 230. System 200 delivers radiation therapy to a patient in accordance with a radiotherapy treatment plan. In some embodiments, image acquisition device 220 may correspond to image acquisition device 140 in FIG. 1 that may acquire a subject patient image.

Couch 210 may support a patient (not shown) during a treatment session. In some implementations, couch 210 may move along a horizontal, translation axis (labelled "I"), such that couch 210 can move the patient resting on couch 210 into and/or out of system 200. Couch 210 may also rotate around a central vertical axis of rotation, transverse to the translation axis. To allow such movement or rotation, couch 210 may have motors (not shown) enabling the couch to move in various directions and to rotate along various axes. A controller (not shown) may control these movements or rotations in order to properly position the patient according to a treatment plan.

In some embodiments, image acquisition device 220 may include an MRI machine used to acquire 2D or 3D MRI images of the patient before, during, and/or after a treatment session. Image acquisition device 220 may include a magnet 221 for generating a primary magnetic field for magnetic resonance imaging. The magnetic field lines generated by operation of magnet 221 may run substantially parallel to the central translation axis I. Magnet 221 may include one or more coils with an axis that runs parallel to the translation axis I. In some embodiments, the one or more coils in magnet 221 may be spaced such that a central window 223 of magnet 221 is free of coils. In other embodiments, the coils in magnet 221 may be thin enough or of a reduced density such that they are substantially transparent to radiation of the wavelength generated by radiotherapy device 230. Image acquisition device 320 may also include one or more shielding coils, which may generate a magnetic field outside magnet 221 of approximately equal magnitude and opposite polarity in order to cancel or reduce any magnetic field outside of magnet 221. As described below, radiation source 231 of radiotherapy device 230 may be positioned in the region where the magnetic field is cancelled, at least to a first order, or reduced.

Image acquisition device 220 may also include two gradient coils 225 and 226, which may generate a gradient magnetic field that is superposed on the primary magnetic field. Coils 225 and 226 may generate a gradient in the resultant magnetic field that allows spatial encoding of the protons so that their position can be determined. Gradient coils 225 and 226 may be positioned around a common central axis with the magnet 221, and may be displaced along that central axis. The displacement may create a gap, or window, between coils 225 and 226. In the embodiments wherein magnet 221 also includes a central window 223 between coils, the two windows may be aligned with each other. In some embodiments, image acquisition device 320 may be an imaging device other than an MRI, such as an X-ray, a CT, a CBCT, a spiral CT, a PET, a SPECT, an optical tomography, a fluorescence imaging, ultrasound imaging, or radiotherapy portal imaging device, etc.

Radiotherapy device 230 may include the source of radiation 231, such as an X-ray source or a linear accelerator, and a multi-leaf collimator (MLC) 233. Radiotherapy device 230 may be mounted on a chassis 235. One or more chassis motors (not shown) may rotate chassis 235 around couch 210 when couch 210 is inserted into the treatment area. In an embodiment, chassis 235 may be continuously rotatable around couch 210, when couch 210 is inserted into the treatment area. Chassis 235 may also have an attached radiation detector (not shown), preferably located opposite to radiation source 231 and with the rotational axis of chassis 335 positioned between radiation source 231 and the detector. Further, device 230 may include control circuitry (not shown) used to control, for example, one or more of couch 210, image acquisition device 220, and radiotherapy device 230. The control circuitry of radiotherapy device 230 may be integrated within system 200 or remote from it, and is functionally represented by control console 110 shown in FIG. 1.

During a radiotherapy treatment session, a patient may be positioned on couch 210. System 200 may then move couch 310 into the treatment area defined by magnetic coils 221, 225, 226, and chassis 235. Control console 240 may then control radiation source 231, MLC 233, and the chassis motor(s) to deliver radiation to the patient through the window between coils 225 and 226 according to a radiotherapy treatment plan.

Figure 3:
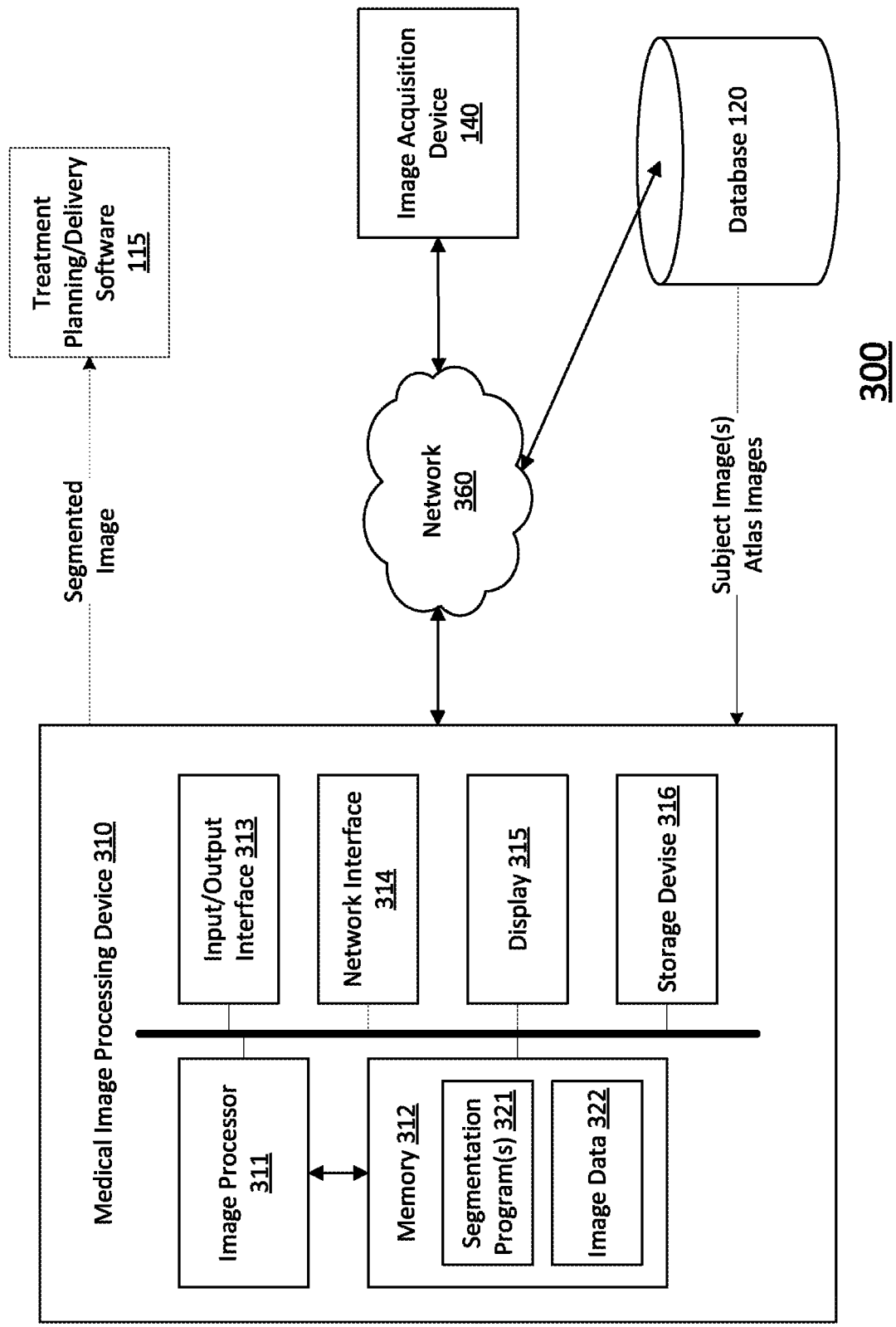
FIG. 3 depicts an exemplary image segmentation system, according to some embodiments of the present disclosure.

FIG. 3 depicts an exemplary image segmentation system 300, consistent with disclosed embodiments. In some embodiments, image segmentation system 300 may include medical image processing device 310 and image database 320, and may be connected to image acquisition device 140 (or 320) through network 360.

Database 320 may be configured to store one or more subject images and a plurality of atlas images and corresponding structure delineations. The subject images and atlas images may be either 2D or 3D images. In some embodiments, database 320 may be part of an oncology information system that manages oncology treatment plans for patients. In some aspects, database 320 may receive these image sets from an image database having images previously acquired during one or more radiotherapy treatment sessions. In some embodiments, image acquisition device 140 may acquire the subject images and store them in image database 320. The images stored in image database 320 may also correspond to images acquired during one or more radiotherapy treatment sessions.

In some aspects, medical image processing device 310 may be configured to segment the subject images based on the atlas images and their delineations. In one embodiment, medical image processing device 310 may be integrated into control console 110 or radiotherapy device 130, shown in FIG. 1. medical image processing device 310 may output segmentation results to treatment planning/delivery software 115 to assist the planning of radiotherapy treatment. Control console 110 may control radiotherapy device 130 to direct a therapy, such as radiation beams, to the structure of interest of the subject patient according to the data of the segmentation results.

In some embodiments, medical image processing device 310 may include an image processor 311, a memory 312, an input/output interface 313, a network interface 314, a display 315, and a storage device 316. Components of medical image processing device 310 may be connected via a BUS. Medical image processing device 310 may be implemented using a special-purpose computer, or a general-purpose computer. For example, medical image processing device 310 may be implemented using a computer custom-built for hospitals to perform image acquisition and image processing tasks.

In some embodiments, image processor 311 may be one or more general-purpose processing devices, such as a microprocessor, central processing unit (CPU), graphics processing unit (GPU), etc. More particularly, image processor 311 may be a complex instruction set computing (CISC) microprocessor, reduced instruction set computing (RISC) microprocessor, very long instruction Word (VLIW) microprocessor, a processor implementing other instruction sets, or processors implementing a combination of instruction sets. In various embodiments, image processor 311 may also be one or more special-purpose processing devices, such as an application specific integrated circuit (ASIC), a field programmable gate array (FPGA), a digital signal processor (DSP), a System on a Chip (SoC), etc. In some aspects, image processor 311 may be communicatively coupled to memory 312 and configured to execute the computer-executable instructions stored thereon.

Memory 312 may be a non-transitory computer-readable medium, such as a read-only memory (ROM), a random access memory (RAM), a phase-change random access memory (PRAM), a static random access memory (SRAM), a dynamic random access memory (DRAM), an electrically erasable programmable read-only memory (EEPROM), other types of random access memories, a flash disk or other forms of flash memory, a cache, a register, a static memory, a compact disc read-only memory (CD-ROM), a digital versatile disc (DVD) or other optical storage, a cassette tape or other magnetic storage devices, or any other non-transitory medium that may be used to store information including images, data, or computer executable instructions capable of being accessed by a processor, or any other type of computer device, etc.

In some embodiments, memory 312 may store computer-executable instructions, such as one or more image segmentation programs 321, as well as data used or generated while executing the computer programs, such as image data 322. Image processor 311 may execute programs 321 to segment the subject images using ABAS methods. For example, image segmentation programs 321 may be programs to estimate structure labels for the subject images. In some embodiments, programs 321 may perform various functions, such as atlas registration and/or selection, training of a structure classifier using the registered and/or selected atlas, and segmentation of subject images using the trained structure classifier.

Image processor 311 may also send and/or receive image data 322 from memory 312. Image processor 311 may communicate with database 320 to read image data 322 into memory 312 or store image data 322 from memory 312 to image database 320. In some embodiments, image data 322 may include subject images acquired MRI images, CT images, PET images, ultrasound images, and computer generated synthetic images, etc. Image data 322 may further include atlas images that are pre-collected and processed, and stored in database 320. Image processor 311 may also generate intermediate data such as registered atlas images, structure labels, parameters of the any classifier model, and send them to memory 312.

Storage device 316 may be an additional storage available to store data and/or computer programs associated with image processing tasks performed by image processor 311. In some embodiments, storage device 316 may include a machine-readable storage medium. While the machine-readable storage medium in an embodiment may be a single medium, the term "machine-readable storage medium" should be taken to include a single medium or multiple media (e.g., a centralized or distributed database, and/or associated caches and servers) that store the one or more sets of computer executable instructions or data. The term "machine-readable storage medium" shall also be taken to include any non-transitory medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical and magnetic media.

Input/output interface 313 may be configured to allow data to be received and/or transmitted by medical image processing device 310, consistent with the disclosed embodiments. Input/output interface 313 may include one or more digital and/or analog communication devices that allow medical image processing device 310 to communicate with a user or other machines and devices. For example, input/output interface 313 may include a keyboard and a mouse for the user to provide input into medical image processing device 310. In an embodiment, the input/output interface 313 may be a cellular device such as a mobile phone, a tablet device such as an iPad, or any other handheld electronic device that is capable of interfacing with the medical image processing device 310. Such a tablet or mobile device includes a display for depicting medical image data and medical images. Further, such tablet or mobile device can be configured with a touch-screen display to manipulate the data and images.

Network interface 314 may be configured to enable medical image processing device 310 to communicate over a network, such as network 360, consistent with disclosed embodiments. In some embodiments, network interface 360 may include at least one of a network adaptor, a cable connector, a serial connector, a USB connector, a parallel connector, a high-speed data transmission adaptor, such as fiber, USB 3.0, thunderbolt, and the like, a wireless network adaptor, such as a Wi-Fi adaptor, a telecommunication (3G, 4G/LTE and the like) adaptor, etc. Medical image processing device 500 may be connected to network 460 through network interface 314.

Image display 315 may be any display device suitable for displaying the images, consistent with disclosed embodiments. For example, image display 315 may be an LCD display, CRT display, LED display, organic light-emitting diode, organic light emitting transistor, field emission display, quantum dot or liquid crystal displays, MEMS display, Ferro liquid display, thick-film dielectric electroluminescent display, bendy displays, foldable displays, haptic touch-screens, virtual reality displays, 3D pixel displays, virtual retina display, holographic display, laser phosphor display and the like.

Network 360 may be configured to provide communications between the components of FIG. 3. For example, network 360 may be any type of network (including infrastructure) that provides communications, exchanges information, and/or facilitates the exchange of electronic information. In this regard, network 360 may include a wired connection, a wireless connection, a computer bus, a serial connection, a parallel connection, an Ethernet connection, a local area network or a wide area network, an internet connection, a satellite connection, or any other suitable connection(s), including a connection to a cloud computing service, or any combination thereof that enables components of image segmentation system 300 to send and to receive information among each other in any format and under any communications protocol.

It is contemplated that FIG. 3 illustrates only an exemplary arrangement of image segmentation system 300. In some embodiments, additional components may be added, and/or the depicted components may be combined, divided, modified, or removed. Further, in some aspects, at least one component of image segmentation system 300 may be geographically remote from the remaining components, and may communicate with the remaining components through network 360.

Figure 4:
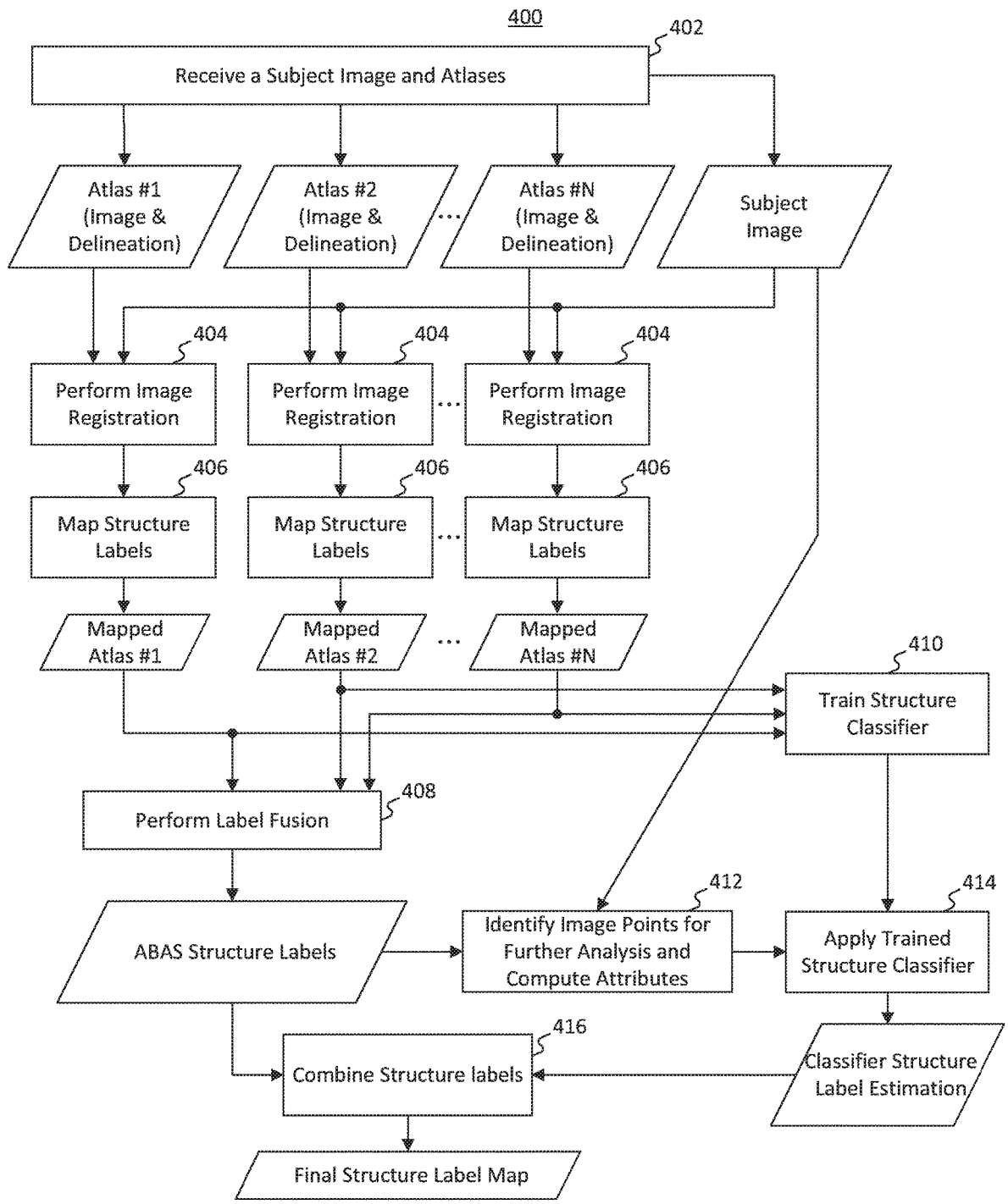
FIG. 4 is a flow chart illustrating an exemplary image segmentation method, performed by the image segmentation system of FIG. 3, according to an exemplary embodiment.

FIG. 4 is a flow chart illustrating an exemplary image segmentation method 400, consistent with the disclosure. In some embodiments, method 400 may be performed by components of image segmentation system 300, such as medical image processing device 310, to segment one or more subject images. Although segmentation of only one structure of interest is described as an example, it is contemplated that method 400 can be applied to segment a group of structures of interest at the same time, such as bladder, prostate, and rectum, which are spatially adjacent and highly correlated. Various machine learning methods, such as Random Forest (RF) method, can naturally handle segmentation of multiple structures at the same time. A multi-structure classifier model may be beneficial when the multiple structures are spatially adjacent and thus highly correlated.

As shown in FIG. 4, at 402, medical image processing device 310 may receive image data 322, including a subject image and one or more atlases, from database 120. In the embodiment shown in FIG. 4, N atlases, Atlas #1, Atlas #2, . . . , and Atlas #N, are used. Although using multiple atlases may be beneficial to improve segmentation accuracy, methods consistent with the disclosure can be applied to the scenario where only one atlas is used. Each of the atlases includes an atlas image and corresponding structure delineations (annotations).

At 404, an image registration is performed to register the atlas images with the subject image. In some embodiments, the registration process may include mapping the image points of each atlas image to the subject image points. In some alternative embodiments, the registration process may include mapping both the atlas images and the subject image to a reference image. In these embodiments, the reference image can be, for example, an average atlas image or a common template image. As such, the atlas images are "indirectly" mapped to the subject image. Various image registration methods can be used, such as one or a combination of any of a linear registration, an object-driven "poly-smooth" non-linear registration, or a shape-constrained dense deformable registration. By performing the image registration, an image transformation from the atlas image to the reference image is calculated for each atlas.

At 406, the delineations (e.g., structure labels) of each atlas are mapped to the space of the reference image using the corresponding image transformation for the atlas. The mapped structure labels represent independent classification data, i.e., independent segmentation results, of the subject image from the corresponding atlas.

As described above, the processes in 404 and 406 result in mapped atlas images, also referred to as "registered atlas images," and mapped structure labels, also referred to as "registered structure labels." A mapped atlas image and corresponding mapped structure labels constitute a mapped atlas, also referred to as a "registered atlas," which can then be used to train a structure classifier for classifying the subject image, as will be described later.

Referring again to FIG. 4, at 408, a label fusion is performed to combine the segmentation results, e.g., label maps, from different atlases to obtain a consensus ABAS segmentation for the structure of interest. Various label fusion methods, such as majority voting and simultaneous truth and performance level estimation (STAPLE), can be employed to combine the mapped structure labels of the different atlases into a consensus ABAS structure label estimation, which includes estimated structure labels, also referred to as ABAS labels, for the subject image points. For example, with a majority voting technique, at each subject image point, each mapped structure label casts a vote regarding whether the corresponding subject image point belongs to the structure of interest or not. The final label of the subject image point can be determined as the one label that has the most votes. For example, in a binary case where the label value is either 1 (for being inside the structure of interest) or 0 (for being outside of the structure of interest), the majority voting can be calculated by taking the average of all the labels at the corresponding subject image point and then assigning the subject image point as being inside the structure of interest or outside of the structure of interest depending on whether the average is higher or lower than a threshold value, such as 0.5. As another example, in the STAPLE method, optimal, non-equal weights can be assigned to different atlases based on some intelligent estimation of the performance or accuracy of each individual atlas. When there are multiple structures of interest, each structure label may indicate which structure the subject image point belongs to, or alternatively, include a set of probability values indicating the probability of the subject image point to belong to the respective structures. The structure labels can also be fused using the same methods described above.

At 410, the structure classifier is trained using one or more of the mapped atlases. In some embodiments, all of the mapped atlases output from the processes of 404 and 406 are used for training the structure classifier. In some embodiments, only one or some of the mapped atlases are selected for the training purpose. In these embodiments, an atlas selection can be performed to obtain a subset of mapped atlases that are suitable for the subject patient. Various criteria can be used for the atlas selection. For example, an image similarity between each mapped atlas image and the subject image (in the scenario where the subject image is the reference image) or the mapped subject image (in the scenario where another image is used as the reference image) can be evaluated and the mapped atlases can be ranked based on the image similarities. The image similarity can be a global similarity, i.e., a similarity between the entire mapped atlas image and the entire subject image/mapped subject image, or a local image similarity, i.e., a similarity between the structure of interest in the mapped atlas image and the structure of interest in the subject image/mapped subject image. For example, the similarity can be calculated as a correlation between the two images, or corresponding portions of the two images. In some embodiments, mapped atlases having a high degree of confidence as to the accuracy of their corresponding classification data are used for the training purpose. In some other embodiments, atlases may be ranked higher if they are associated with the same patient, from which the subject image is acquired.

Mapped atlases with higher ranks are used for the training. Detailed process for training the structure classifier will be described later with reference to FIG. 5. After the structure classifier is trained, the structure classifier can be used to determine structure labels for input image points based on corresponding attributes of the image points.

As shown in FIG. 4, at 412, the ABAS structure label estimation obtained from the label fusion is used to identify what subject image points are to be further analyzed using the trained structure classifier. Various techniques can be used to select a subset of subject image points for further analysis. For example, criteria can be defined for assessing whether the ABAS label for a subject image point is ambiguous, and then subject image points for which the ABAS labels are ambiguous can be included in the subset for further analysis.

As an example of such ambiguity criteria, subject image points for which there is a disagreement regarding classification among the various ABAS labels obtained from different atlas registrations are included in the subset for further analysis. In some embodiments, the ABAS label for each subject image point is accompanied with an estimated accuracy (e.g., a probability value). In these scenarios, the estimated accuracy can be used to determine whether the associated subject image point is ambiguous. For example, subject image points having an accuracy of, e.g., 50%, or below are included in the subset for further analysis. As another example, a proximity around the border of the structure of interest can be defined and subject image points within the proximity can be included in the subset for further analysis.

In some embodiments, attributes, also known as image features, that are to be used by the trained structure classifier are also computed at 412. The attributes can be the same types of attributes used for training the structure classifier, as will be described in more detail below in connection with FIG. 5. Various methods may be used to compute the attributes, including using machine learning models such as convolutional neural network models.

At 414, the subject image points in the subset for further analysis are applied to the trained structure classifier, which will provide another set of structure labels for those image points in the subset. This set of structure labels estimated by the classifier may or may not agree with the ABAS structural labels generate in 408.

At 416, the ABAS structure labels and the classifier structure labels are combined to generate final structure labels, which represents the final segmentation result for the subject image. Various techniques can be used to combine the labels. For example, majority voting between the ABAS structure label estimation and the classifier structure label estimation can be employed. As another example, if the trained structure classifier produces a hard decision, the results from the structure classifier can be taken as another label map and a label fusion between the label map resulting from the ABAS and the label map generated by the structure classifier can be performed. As yet another example, if ABAS and the structure classifier provide estimated probabilities, $P_L$ and $P_C$, respectively, as structure labeling results, a final structure probability P for a subject image point can be calculated as a weighted average of the estimate probabilities from the two techniques:

$$P = w_L P_L + w_C P_C, \text{ where } w_L + w_C = 1.$$

The weights $w_L$ and $w_C$ can be equal to or different from each other. The weights can be manually set or automatically determined based on a training procedure such as cross-validation. Once the final structure probability P for a subject image point is calculated, whether the subject image point belongs to the structure of interest can be determined by determining whether the final structure probability P is higher than a threshold, such as 0.5.

Figure 5:
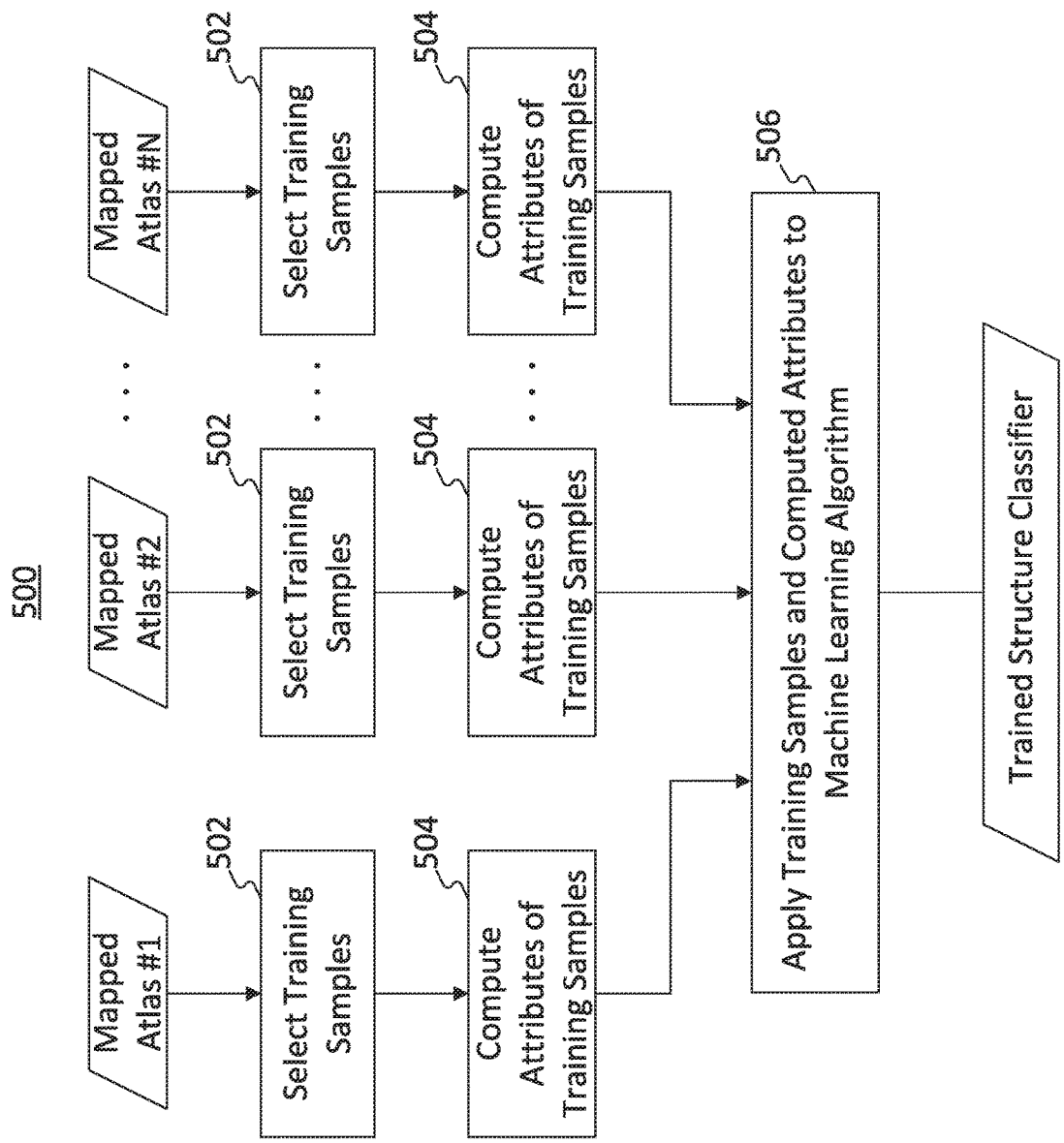
FIG. 5 is a flow chart illustrating an exemplary structure classifier training method, performed by the image segmentation system of FIG. 3, according to an exemplary embodiment.

FIG. 5 is a flow chart schematically showing an exemplary method 500 for training the structure classifier using one or more of the mapped atlases. A mapped atlas used for the training purpose is also referred to as a training atlas. According to the disclosure, a machine learning algorithm may be applied to data from the training atlases (the atlas images and their associated classification data) to produce the trained structure classifier. According to the disclosure, the structure classifier can be trained before the label fusion (method 400 at 408) is performed, after the label fusion is performed but before the subject image points for further analysis are identified (method 400 at 412), after the subject image points for further analysis are identified, or during either of these two processes.

As shown in FIG. 5, at 502, a plurality of training samples can be selected from the mapped atlas image of each training atlas. Each training sample can correspond to a single image point or a group of image points (such a group of image points is also referred to as a super image point). According to the disclosure, the training samples from a mapped atlas image can include all or a portion of the image points on the mapped atlas image. When only a portion of the image points are used for training, a sample selection can be performed to determine what image points are used. For example, the training samples can be selected fully randomly over the entire mapped atlas image, or be selected from a region within a certain distance to the border of the structure of interest. Examples of selecting training samples from such a region are described in U.S. Pat. No. 9,122,950. As another example, the sample selection can be guided by the registration results such that more samples can be selected from an ambiguous region, i.e., the region where structure labels from different mapped atlases do not completely agree with each other or the disagreement is larger than a certain level (for example, three or more out of ten mapped atlases have a different determination than the other mapped atlases).

At 504, a plurality of attributes (or features) can be computed for the selected training samples. These attributes are to be used by the machine learning algorithm as part of its classification task. When being applied to classify an image point of a subject image, the trained structure classifier will make decisions about the structure label of the image point based on computed attributes associated with the image point. One or more types of attributes can be computed for each training sample. Various types of attributes can be used, such as, for example, image intensity value, image location, image gradient and gradient magnitude, eigen-values of a Hessian matrix of the image, image texture measures such as energy, entropy, contrast, homogeneity, and correlation of local co-occurrence matrix, local image patches of varying sizes, as described in more detail in U.S. Pat. No. 9,122,950. Alternatively, attributes or features may also be automatically and adaptively computed using machine learning models. For example, a convolutional neural network model may be trained to extract relevant features from sample images, and the pre-trained model can be applied to the training samples to produce attributes. A convolutional neural network typically includes several convolution layers, among other layers, that produce feature maps of various sizes. The feature maps contain generic features characterizing the input image (or a selected portion of the input image), and thus can be used as features in the structure classifier to further improve classification results. Features from various convolution layers (e.g., top layers, middle layers, lower layers), or a selection of these layers, may be used. In some embodiments, computation of attributes can be omitted if the training atlases already include the attributes for the atlas image points that are to be used by the machine learning algorithm.

At 506, the collected training samples and the computed attributes are applied to the machine learning algorithm to produce the trained structure classifier. The machine learning algorithm can be a supervised learning algorithm, which seeks to infer a prediction model given a set of training data. For example, the machine learning algorithm for training the structure classifier can be the random forests (RF) machine learning algorithm, which can naturally handle multiple classes, i.e., one classifier to classify several structures. The output of an RF classifier can be a probability estimation of which class the input data belongs to, i.e., which structure the corresponding image point belongs to. The RF algorithm is described in more detail in U.S. Pat. No. 9,122,950. After the trained structure classifier is obtained, it can be stored and applied during later use in connection with auto-segmentation of the subject image, such as used in 414 of method 400.

Figure 6B:
FIGS. 6A and 6B show comparisons between segmentation results from a conventional method and an exemplary method consistent with the present disclosure.
Figure 6A:
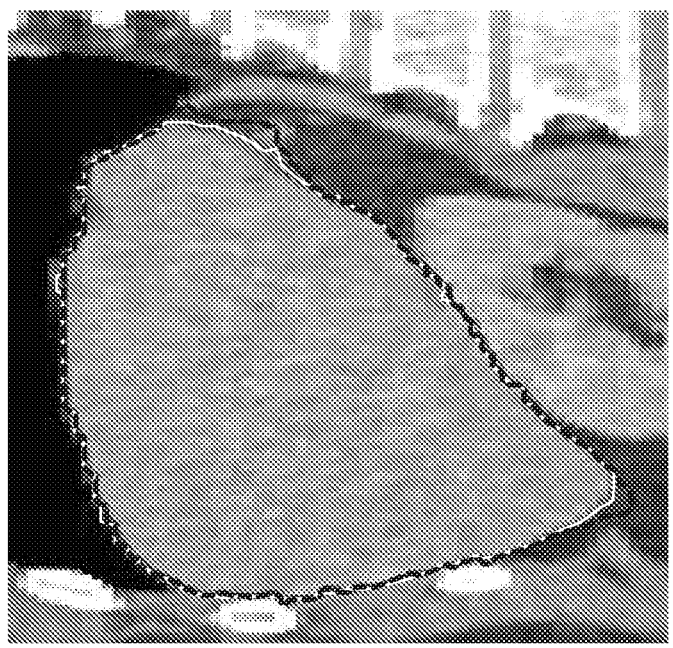

FIGS. 6A and 6B show comparisons between the structure border estimated by the STAPLE method (dashed black line) and the structure border estimated by the online learning-enhanced ABAS method consistent with the disclosure (solid white line). The subject images shown in FIGS. 6A and 6B are images of the liver and the right kidney of a same subject patient. As shown in both FIGS. 6A and 6B, the online learning-enhanced ABAS method produces more accurate borders than the STAPLE method. In particular, as shown in FIG. 6B, the STAPLE method misses the bottom portion of the kidney, whereas the estimated border from the online learning-enhanced ABAS method better conforms to the actual border of the kidney.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, examples in which only those elements shown or described are provided. Moreover, any combination or permutation of those elements shown or described (or one or more aspects thereof), either with respect to a particular example (or one or more aspects thereof), or with respect to other examples (or one or more aspects thereof) shown or described herein are within the scope of the present disclosure.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

A machine or computer-readable storage medium may include one or more non-transitory media (e.g., a centralized or distributed database, and/or associated caches and servers). Such a machine or computer-readable storage medium may store computer-executable instructions or data that may cause a machine to perform the functions or operations described. Such a machine or computer-readable storage medium may include any mechanism that stores information in a form accessible by a machine (e.g., computing device, electronic system, and the like), such as recordable/non-recordable medium (e.g., read only memory (ROM), random access memory (RAM), magnetic disk storage medium, optical storage medium, flash memory devices, and the like). For example, the term "machine-readable storage medium" or "computer-readable storage medium" shall accordingly be taken to include, but not be limited to, solid-state memories, optical, and magnetic medium.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An image segmentation method, comprising:
   receiving, by an image processor, a subject image acquired by an image acquisition device and showing a structure of interest;
   determining, by the image processor, a first structure label map for the structure of interest by registering atlases to the subject image;
   detecting a disparity of a structure label determined for a given region in the subject image by two of the registered atlases; and
   resolving the disparity by applying a trained structure classifier to one or more subject image points in the subject image, the trained structure classifier being trained based on training samples that are selected for a subset of mapped atlases in response to determining that a first structure label determined for a given region of a training image is different from a second structure label for the given region of the training image.

2. The image segmentation method of claim 1 further comprising:
   receiving a plurality of atlases, each atlas including an atlas image showing a structure of interest and associated structure delineations;
   calculating the mapped atlases by registering the respective atlases to the subject image;
   determining, by the image processor, a second structure label map for the structure of interest, wherein the disparity is detected based on a comparison of the first and second structure label maps; and
   combining, by the image processor, the first structure label map and the second structure label map to generate a third structure label map representative of the structure of interest.

3. The method of claim 2, wherein calculating the mapped atlases includes:
   mapping the atlas image in each atlas to the subject image;
   calculating a registration transformation for each atlas based on the mapping; and
   calculating mapped structure delineations for each atlas by applying the registration transformation to the structure delineations of the atlas.

4. The method of claim 2, wherein determining the first structure label map includes:
   determining atlas-based auto-segmentation (ABAS) structure label maps corresponding to the atlases based on the respective structure delineations; and
   determining the first structure label map by fusing the ABAS structure label maps, wherein fusing the ABAS structure label is according to at least one of a majority voting method or a simultaneous truth and performance level estimation (STAPLE) method.

5. The method of claim 1 further comprising registering the atlases to the subject image by mapping each atlas image and the subject image to a common reference image.

6. The method of claim 5, wherein the reference image is an average atlas image obtained by averaging the atlas images.

7. The method of claim 1, further comprising selecting a subset of the mapped atlases based on a selection criterion.

8. The method of claim 7, wherein selecting the subset of the mapped atlases includes:
   determining an image similarity between each mapped atlas image and the subject image;
   ranking the mapped atlases based on the image similarities of the respective mapped atlas images; and
   selecting the subset of the mapped atlases based on the ranking.

9. The method of claim 8, wherein determining the image similarity includes determining a global similarity indicating how the corresponding mapped atlas image as a whole correlates with the subject image as a whole, or determining a local similarity representing how the structure of interest in the corresponding mapped atlas image correlates with the structure of interest in the subject image.

10. The method of claim 1, wherein applying the trained structure classifier includes applying a random forest algorithm to the one or more subject image points in the subject image to obtain a random forest model.

11. The method of claim 1, wherein determining that the first structure label is different from the second structure label comprises determining that a number of mapped atlases exceeds a specified amount such that a disagreement between structure labels among the mapped atlases for the given region is larger than a certain level.

12. The method of claim 1, wherein the trained structure classifier comprises a convolutional neural network.

13. An image segmentation apparatus, comprising:
   an image processor configured to perform operations comprising:
   receiving a subject image acquired by an image acquisition device and showing a structure of interest;
   determining a first structure label map for the structure of interest by registering atlases to the subject image;
   detecting a disparity of a structure label determined for a given region in the subject image by two of the registered atlases; and
   resolving the disparity by applying a trained structure classifier to one or more subject image points in the subject image, the trained structure classifier being trained based on training samples that are selected for a subset of mapped atlases in response to determining that a first structure label determined for a given region of a training image is different from a second structure label for the given region of the training image.

14. The apparatus of claim 13, wherein the operations further comprise:
   receiving a plurality of atlases, each atlas including an atlas image showing a structure of interest and associated structure delineations;
   calculating the mapped atlases by registering the respective atlases to the subject image;
   determining, by the image processor, a second structure label map for the structure of interest, wherein the disparity is detected based on a comparison of the first and second structure label maps; and
   combining, by the image processor, the first structure label map and the second structure label map to generate a third structure label map representative of the structure of interest.

15. The apparatus of claim 14, wherein calculating the mapped atlases includes:
   mapping the atlas image in each atlas to the subject image;
   calculating a registration transformation for each atlas based on the mapping; and
   calculating mapped structure delineations for each atlas by applying the registration transformation to the structure delineations of the atlas.

16. The apparatus of claim 14, wherein determining the first structure label map includes:

determining atlas-based auto-segmentation (ABAS) structure label maps corresponding to the atlases based on the respective structure delineations; and determining the first structure label map by fusing the ABAS structure label maps, wherein fusing the ABAS structure label is according to at least one of a majority voting method or a simultaneous truth and performance level estimation (STAPLE) method.

17. The apparatus of claim 13, wherein the operations further comprise registering the atlases to the subject image by mapping each atlas image and the subject image to a common reference image.

18. The apparatus of claim 17, wherein the reference image is an average atlas image obtained by averaging the atlas images.

19. The apparatus of claim 13, wherein the operations further comprise selecting a subset of the mapped atlases based on a selection criterion.

20. A non-transitory computer-readable storage medium storing instructions that, when executed by an image processor, cause the processor to perform an image segmentation method, comprising:

receiving a subject image acquired by an image acquisition device and showing a structure of interest;

determining a first structure label map for the structure of interest by registering atlases to the subject image;

detecting a disparity of a structure label determined for a given region in the subject image by two of the registered atlases; and resolving the disparity by applying a trained structure classifier to one or more subject image points in the subject image, the trained structure classifier being trained based on training samples that are selected for a subset of mapped atlases in response to determining that a first structure label determined for a given region of a training image is different from a second structure label for the given region of the training image.

* * * * *